US012316992B2

(12) United States Patent
Yang

(10) Patent No.: US 12,316,992 B2
(45) Date of Patent: May 27, 2025

(54) SOLID-STATE IMAGING DEVICE, METHOD OF CONTROLLING SOLID-STATE IMAGING DEVICE, AND MOBILE BODY

(71) Applicant: Sony Group Corporation, Tokyo (JP)

(72) Inventor: Seungha Yang, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 98 days.

(21) Appl. No.: 17/926,026

(22) PCT Filed: May 10, 2021

(86) PCT No.: PCT/JP2021/017614
§ 371 (c)(1),
(2) Date: Nov. 17, 2022

(87) PCT Pub. No.: WO2021/246107
PCT Pub. Date: Dec. 9, 2021

(65) Prior Publication Data
US 2023/0179892 A1 Jun. 8, 2023

(30) Foreign Application Priority Data
Jun. 5, 2020 (JP) .................................. 2020-098863

(51) Int. Cl.
*H04N 7/18* (2006.01)
*G01C 21/16* (2006.01)
(Continued)

(52) U.S. Cl.
CPC ............. *H04N 25/78* (2023.01); *G01C 21/16* (2013.01); *G06T 7/246* (2017.01); *H04N 25/79* (2023.01); *G06T 2207/30252* (2013.01)

(58) Field of Classification Search
CPC .......... H04N 25/78; H04N 25/79; H04N 7/18; G06T 7/246; G06T 2207/30252; G01C 21/16
(Continued)

(56) References Cited

U.S. PATENT DOCUMENTS 7,040,166 B2   5/2006   Babala
7,934,423 B2   5/2011   Nasiri
(Continued)

FOREIGN PATENT DOCUMENTS

CN   104204721 B   12/2014
CN   107462742 A   12/2017
(Continued)

OTHER PUBLICATIONS

International Search Report (PCT/ISA/210), International Application No. PCT/JP2021/017614, dated Jul. 20, 2021.
(Continued)

*Primary Examiner* — Trang U Tran
(74) *Attorney, Agent, or Firm* — Michael Best & Friedrich LLP

(57) ABSTRACT

Provided are a solid-state imaging device capable of dynamically changing a measurable range of acceleration to accurately measure acceleration, and a method of controlling the solid-state imaging device.
A solid-state imaging device according to the present disclosure is a solid-state imaging device disposed on a mobile body, the solid-state imaging device including: an imaging section that photoelectrically converts incident light into a charge amount according to a light amount and images a target object; a motion detecting section that calculates a speed of the target object on the basis of a plurality of images imaged by the imaging section; and an inertial measurement section that detects an acceleration or an angular velocity of
(Continued)

the mobile body and changes a measurable range of the acceleration or the angular velocity of the mobile body according to the speed of the target object.

15 Claims, 12 Drawing Sheets

(51) Int. Cl.
   *G06T 7/246* (2017.01)
   *H04N 25/78* (2023.01)
   *H04N 25/79* (2023.01)
(58) Field of Classification Search
   USPC .......................................................... 348/148
   See application file for complete search history.

(56) References Cited

U.S. PATENT DOCUMENTS

| | | | |
|---|---|---|---|
| 8,186,221 | B2 | 5/2012 | Lin |
| 10,885,640 | B2 * | 1/2021 | Kellner .................. G06T 7/285 |
| 10,887,568 | B2 * | 1/2021 | Imai ........................ H04N 7/18 |
| 11,536,839 | B2 * | 12/2022 | Dilz, Jr. .................. G01S 17/10 |
| 2011/0132089 | A1 * | 6/2011 | Jeong .................... G01P 15/125 |
| | | | 73/514.01 |
| 2012/0232847 | A1 | 9/2012 | Horton |
| 2013/0255380 | A1 | 10/2013 | Salsman |
| 2015/0341531 | A1 * | 11/2015 | Senda ................... H04N 23/54 |
| | | | 348/308 |
| 2019/0180451 | A1 | 6/2019 | Kellner |

FOREIGN PATENT DOCUMENTS

| | | | |
|---|---|---|---|
| CN | 111208317 | A | 5/2020 |
| JP | 2001050713 | A | 2/2001 |
| JP | 2002016835 | A | 1/2002 |
| JP | 2008008820 | A | 1/2008 |
| JP | 2017130610 | A | 7/2017 |
| JP | 2018164199 | A | 10/2018 |
| JP | 2019083390 | A | 5/2019 |
| JP | 2019110509 | A | 7/2019 |
| JP | 2020085918 | A | 6/2020 |
| KR | 20130120431 | A | 11/2013 |
| TW | 202001288 | A | 1/2020 |
| WO | 2010026843 | A1 | 3/2010 |

OTHER PUBLICATIONS

Skog, Isaac, et al. "Inertial Sensor Arrays, Maximum Likelihood, and Cramer-Rao Bound" Apr. 19, 2016, retrieved from https://arxiv.org/pdf/1509.06494.

Audi, Ahmad, et al. "Implementation of an IMU Aided Image Stacking Algorithm in a Digital Camera for Unmanned Aerial Vehicles" Jul. 18, 2017, retrieved from www.mdpi.com/journey/sensors, http://www.ncbi.nim.nih.gov/pmc/articles/PMC5539653/pdf/sensors-17-071646.

Koh Oi Fung Eta L: "A novel 6-degree offr eedom man-machine interface using MEMS sensors and computer vsion", 2015 IEEE 12th International Conference On Networking, Sensing and Control, IEEE, Apr. 9, 2015 (Apr. 9, 2015), pp. 344-349,XP032782218, DOI: 10.1109/ICNSC.2015.7116060 [retrieved on Jun. 1, 2015].

* cited by examiner

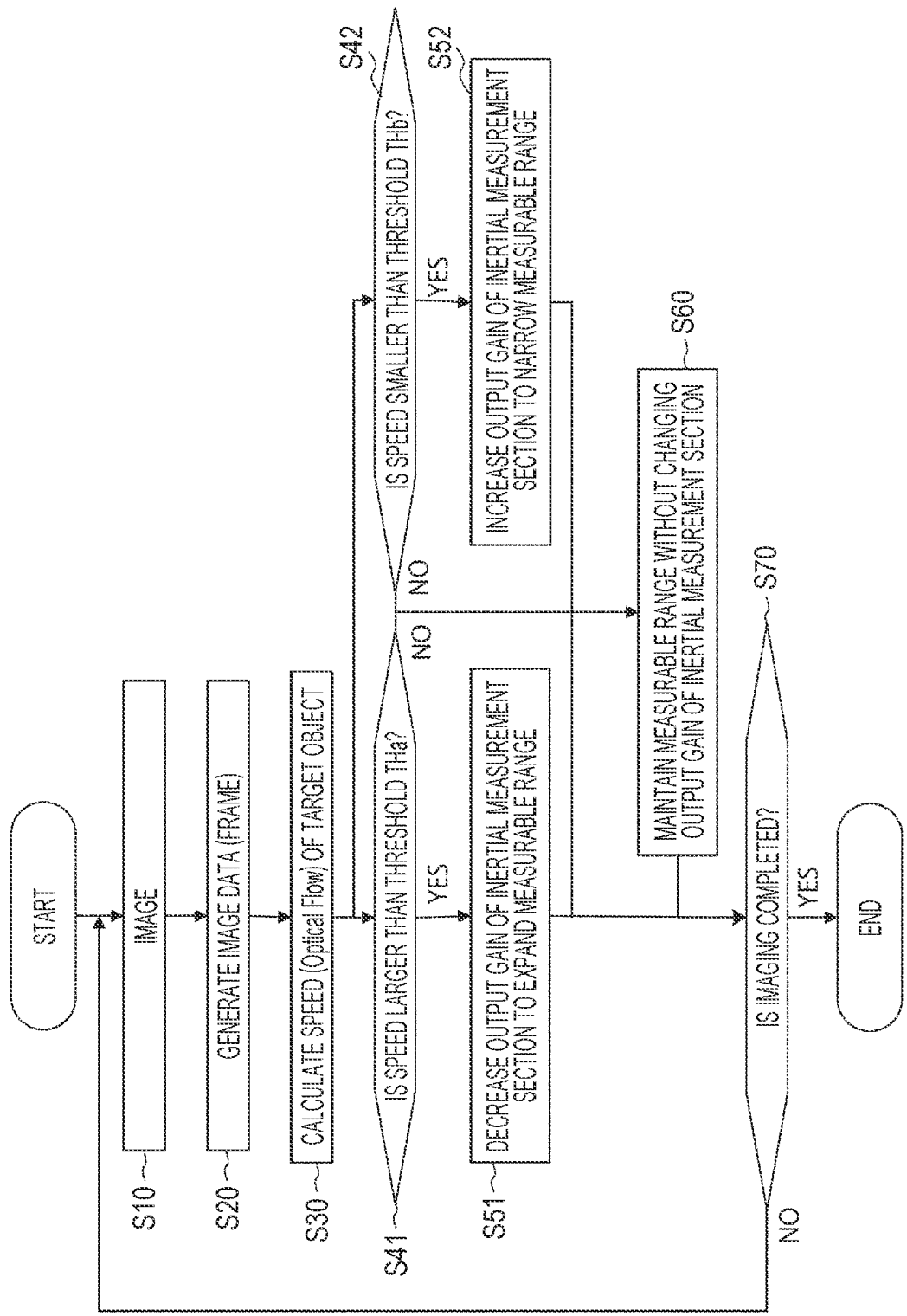

SOLID-STATE IMAGING DEVICE, METHOD OF CONTROLLING SOLID-STATE IMAGING DEVICE, AND MOBILE BODY

TECHNICAL FIELD

The present disclosure relates to a solid-state imaging device and a method of controlling the solid-state imaging device and a mobile body.

BACKGROUND ART

An inertial measurement unit (IMU) may be used to obtain acceleration information of a drone, a base terminal, an automobile, an airplane, and the like. A solid-state imaging device equipped with such an IMU has been conventionally developed.

CITATION LIST

Non Patent Document

Non Patent Document 1:
https://www.nobi.nlm.nih.gov/pmc/articles/PMC5539653/pdf/sensors-17-01646.pdf
Non Patent Document 2:
https://arxiv.org/pdf/1509.06494.pdf

SUMMARY OF THE INVENTION

Problems to be Solved by the Invention

However, in conventional elements, the measurable range of the acceleration is set in advance. For this reason, when the solid-state imaging device operates at an acceleration outside the measurable range, the IMU cannot accurately measure the acceleration.

In order to solve the problems described above, the present disclosure provides a solid-state imaging device capable of dynamically changing a measurable range of acceleration to accurately measure acceleration, a method of controlling the solid-state imaging device, and a mobile body.

Solutions to Problems

A solid-state imaging device according to one aspect of the present disclosure is a solid-state imaging device disposed on a mobile body, the solid-state imaging device including: an imaging section that photoelectrically converts incident light into a charge amount according to a light amount and images a target object; a motion detecting section that calculates a of the target object on the basis of a plurality of images imaged by the imaging section; and an inertial measurement section that detects an acceleration or an angular velocity of the mobile body and changes a measurable range of the acceleration or the angular velocity of the mobile body according to the speed of the target object.

The inertial measurement section may expand the measurable range in a case where the speed of the target object exceeds a first threshold.

The inertial measurement section may narrow the measurable range in a case where the speed of the target object falls below a second threshold.

The imaging section may image the target object at predetermined time intervals, and the motion detecting section may calculate the speed of the target object on the basis of a movement distance of a feature point of the target object between a first image imaged at a certain time point and a second image imaged at a next time point.

The inertial measurement section may change the measurable range in a case where it is estimated, from a change in the speed of the target object, that the speed of the target object reaches a third threshold in a third image imaged at a next time point.

The solid-state imaging device may further include: an AD converter that performs analogue-to-digital (AD) conversion of a pixel signal from the imaging section into a digital signal; a signal processing section that processes the digital signal to generate image data;

a memory that stores the image data; and a controller that controls a measurable range of the inertial measurement section on the basis of the speed of the target object, in which the controller or the memory may be disposed between the inertial measurement section and the signal processing section.

The solid-state imaging device may further include: an AD converter that performs AD conversion of a pixel signal from the imaging section into a digital signal; a signal processing section that processes the digital signal to generate image data; a memory that stores the image data; and a controller that controls a measurable range of the inertial measurement section on the basis of the speed of the target object, in which the controller or the memory may be disposed between the inertial measurement section and the motion detecting section.

The solid-state imaging device may be configured by stacking: a first semiconductor chip including the imaging section; and a second semiconductor chip including the motion detecting section and the inertial measurement section.

The solid-state imaging device may be configured by stacking: a first semiconductor chip including the imaging section; and a second semiconductor chip including the motion detecting section, the inertial measurement section, the AD converter, the signal processing section, the memory, and the controller.

The solid-state imaging device may be configured by stacking: a first semiconductor chip including the imaging section; a second semiconductor chip including the inertial measurement section; and a third semiconductor chip including the motion detecting section.

The solid-state imaging device may be configured by stacking: a first semiconductor chip including the imaging section; a second semiconductor chip including the inertial measurement section and the AD converter; and a third semiconductor chip including the motion detecting section, the signal processing section, the memory, and the controller.

A method of controlling a solid-state imaging device according to the present disclosure is a method of controlling a solid-state imaging device disposed on a mobile body, the solid-state imaging device including an imaging section that photoelectrically converts incident light into a charge amount according to a light amount and images a target object, a motion detecting section that calculates a speed of the target object, and an inertial measurement section that detects an acceleration or an angular velocity, the method including: imaging the target object by the imaging section; calculating, in the motion detecting section, a speed of the target object on the basis of a plurality of images imaged by the imaging section; and changing, in the inertial measurement section, a measurable range of an acceleration or an angular velocity of the mobile body according to the speed of the target object.

The changing of the measurable range may include: expanding the measurable range in a case where the speed of the target object exceeds a first threshold; and narrowing, in the inertial measurement section, the measurable range in a case where the speed of the target object falls below a second threshold.

The target object may be imaged at predetermined time intervals, and the speed of the target object may be calculated on the basis of a movement distance of a feature point of the target object between a first image imaged at a certain time point and a second image imaged at a next time point.

The measurable range may be changed in a case where it is estimated, from a change in the speed of the target object, that the speed of the target object reaches a third threshold in a third image imaged at a next time point.

A mobile body according to the present disclosure is a mobile body including a solid-state imaging device, the solid-state imaging device including: an imaging section that photoelectrically converts incident light into a charge amount according to a light amount and images a target object; a motion detecting section that calculates a speed of the target object on the basis of a plurality of images imaged by the imaging section; and an inertial measurement section that detects an acceleration or an angular velocity of the mobile body and changes a measurable range of the acceleration or the angular velocity of the mobile body according to the speed of the target object.

BRIEF DESCRIPTION OF DRAWINGS

FIG. 2 is a flowchart depicting an example of a method of controlling the solid-state imaging device according to the first embodiment.

MODE FOR CARRYING OUT THE INVENTION

Figure 1A:
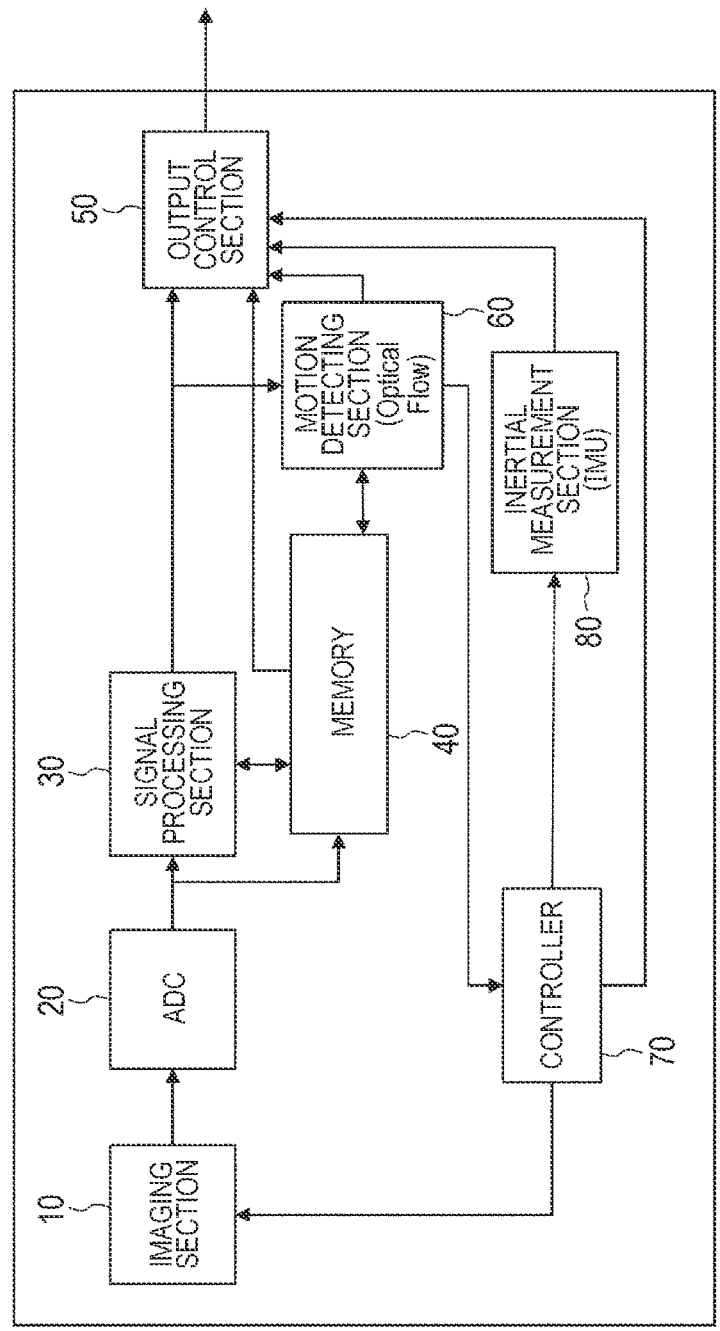
FIG. 1A is a block diagram depicting an example of a configuration of a solid-state imaging device according to a first embodiment.

Hereinafter, specific embodiments to which the present technology is applied will be described in detail with reference to the drawings. The drawings are schematic or conceptual, and the ratio of each portion and the like are not necessarily the same as actual ones. In the specification and the drawings, similar elements as those described above with respect to the previously described drawings are denoted by the same reference numerals, and the detailed description thereof is appropriately omitted.

First Embodiment

FIG. 1A is a block diagram depicting an example of a configuration of a solid-state imaging device 1 according to a first embodiment. The solid-state imaging device 1 is disposed on a mobile body such as a drone, a base terminal, an automobile, an airplane, an XR (VR (Virtual Reality), AR (Augmented Reality), MR (Mixed Reality)) controller, XR goggles, and the like, for example. The solid-state imaging device 1 detects speed, acceleration, and rotation information of such a mobile body while imaging the periphery of the mobile body.

The solid-state imaging device 1 includes an imaging section 10, an ADC (analogue-to-digital converter) 20, a signal processing section 30, a memory 40, an output control section 50, a motion detecting section 60, a controller 70, and an inertial measurement section (IMU) 80.

The imaging section 10 includes a plurality of pixels including a photoelectric conversion element that photoelectrically converts incident light into a charge amount corresponding to a light amount of the incident light. The imaging section 10 is, for example, a complementary metal oxide semiconductor (CMOS) image sensor. The plurality of pixels is two-dimensionally disposed in a matrix. Although not illustrated, the pixel section 101 includes a pixel drive line wired for each pixel row and a vertical signal line wired for each pixel column in a pixel array in a matrix. The pixel drive lines are sequentially selected (scanned) in units of pixel rows when the pixel signals are read out. Every time each pixel row is selected, the vertical signal line transfers pixel signals from a plurality of pixels included in the selected pixel row.

The pixel signal from the vertical signal line is transferred to the ADC 20, and is AD-converted from an analog signal to a digital signal. The AD conversion is performed, for example, by performing correlated double sampling (CDS)

processing using a comparator, a counter, and the like. One or more ADCs 20 are provided corresponding to the vertical signal lines, and perform AD conversion on each pixel signal. The AD-converted pixel signal is transferred to the signal processing section 30.

The signal processing section 30 processes the AD-converted pixel signal to generate image data. For example, the signal processing section 30 corrects vertical line defects and point defects, clamps signals, and performs digital signal processing such as parallel-to-serial conversion, compression, encoding, addition, averaging, and intermittent operation. The signal processing section 30 stores the generated image data in the memory 40 and transfers the generated image data to the output control section 50. The imaging section 10 images the target object at predetermined time intervals, and the signal processing section 30 generates image data for every imaging. The image data corresponding to each imaging is hereinafter also referred to as a frame. That is, one frame is generated every time an image is imaged by the imaging section 10. The plurality of frames acquired at predetermined time intervals is stored in the memory 40 and transferred to the output control section 50. Note that the signal processing section 30 may generate one frame for every time of a plurality of imaging. Alternatively, the signal processing section 30 may interpolate between a plurality of frames to generate a larger number of frames than the number of imaging.

The memory 40 stores the frame (image data) from the signal processing section 30. Further, the memory 40 may store the pixel signal AD-converted by the ADC 20 as it is.

The output control section 50 outputs the frame from the signal processing section 30 or the memory 40 to the outside of the solid-state imaging device 1. At this time, the output control section 50 may convert the signal level and output the converted signal level.

The motion detecting section 60 calculates the speed of the target object using a plurality of frames obtained from a plurality of images imaged by the imaging section 10. For example, the motion detecting section 60 obtains a motion vector (optical flow) of the target object using a plurality of frames, and calculates the speed of the target object by dividing the motion vector by a time interval (for example, a time interval of imaging) between the frames. A specific calculation of the speed of the target object will be described later.

The motion vector and the speed of the target object calculated by the motion detecting section 60 are stored in the memory 40 and transferred to the controller 70. Furthermore, the motion vector and the speed of the target object may be output to the outside via the output control section 50.

The controller 70 controls the internal configuration of the solid-state imaging device 1 such as the imaging section 10, the output control section 50, the inertial measurement section 80, and the like. For example, the controller 70 controls the measurable range of the inertial measurement section 80 on the basis of the speed of the target object. The controller 70 controls imaging timing and the like of the imaging section 10, and controls a signal level, output timing, and the like of data output from the output control section 50.

Figure 1B:
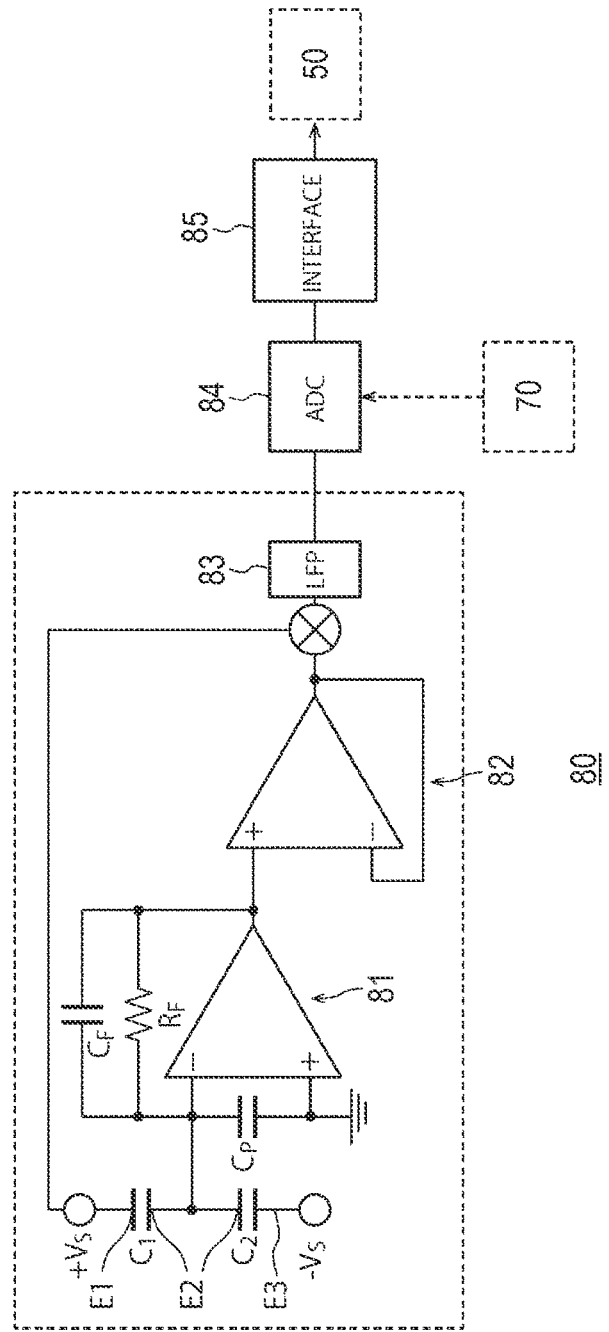
FIG. 1B a circuit diagram showing an example of a configuration of an MEMS sensor as an inertial measurement section.

The inertial measurement section (IMU) 80 may be, for example, a micro electro mechanical systems (MEMS) sensor that detects acceleration or angular velocity of the solid-state imaging device 1. For example, FIG. 1B is a circuit diagram depicting an example of a configuration of an MEMS sensor as inertial measurement section 80. The MEMS sensor includes capacitor elements C1 and C2 including fixed electrodes E1 and E3 fixed on a semiconductor substrate and a movable electrode E2 elastically movable with respect to the semiconductor substrate. The MEMS sensor detects the acceleration and the angular velocity of the capacitor elements C1 and C2 on the basis of a change in capacitance of the capacitor elements C1 and C2 due to the acceleration and the angular velocity. When the speed and posture of the solid-state imaging device 1 change, the movable electrode E2 moves with respect to the fixed electrodes E1 and E3, and the electrostatic capacitances of the capacitor elements C1 and C2 change. The inertial measurement section 80 can measure the acceleration and the angular velocity of the solid-state imaging device 1 by detecting changes in the capacitance of the capacitor elements C1 and C2.

Thereafter, the change in the capacitance of the capacitor elements C1 and C2 is AD-converted into a digital value in an ADC 84 via a low-pass filter 83. The controller 70 controls a gain in AD conversion of the ADC 84. The measurable range of the acceleration of the inertial measurement section 80 can be changed by changing the gain of the AD conversion. This digital value is output to the outside of the inertial measurement section 80 via an interface 85.

The inertial measurement section 80 moves together with the mobile body, and can detect acceleration of the mobile body, at six degrees of freedom (DoF). The acceleration of 6 DoFs includes an acceleration at the position of the mobile body and an angular velocity or an angular acceleration of a posture (rotation direction) of the mobile body. Hereinafter, the acceleration of 6 DoF is also simply referred to as "acceleration".

The inertial measurement section 80 has a measurable range for acceleration. For example, in a case where the output gain of the inertial measurement section 80 is relatively small, the measurable range is expanded, and a larger acceleration can be detected as an absolute value, but the sensitivity of the inertial measurement section 80 decreases. On the other hand, in a case where the output gain of the inertial measurement section 80 is relatively large, the sensitivity of the inertial measurement section 80 is improved, but the measurable range is narrowed, and only a smaller acceleration can be detected as an absolute value.

Thus, in the present disclosure, the inertial measurement section 80 changes the measurable range of the acceleration of the mobile body in which the solid-state imaging device 1 is disposed according to the speed of the imaged target object under the control of the controller 70. In the inertial measurement section 80, information of the measured acceleration of the mobile body is output from the output control section 50 to the outside. In addition, gain change information indicating that the output gain of the inertial measurement section 80 has been changed is only required to be output from the controller 70 to the outside via the output control section 50.

The inertial measurement section 80 may include a plurality of IMUs having different measurable ranges. In this case, each IMU may have a narrow measurable range and be at low cost. By combining such a plurality of IMUs having different measurable ranges, the inertial measurement section 80 can be configured as an IMU having a wide measurable range by switching the IMUs to be used.

Next, an operation (control method) of the solid-state imaging device 1 will be described.

Figure 3:
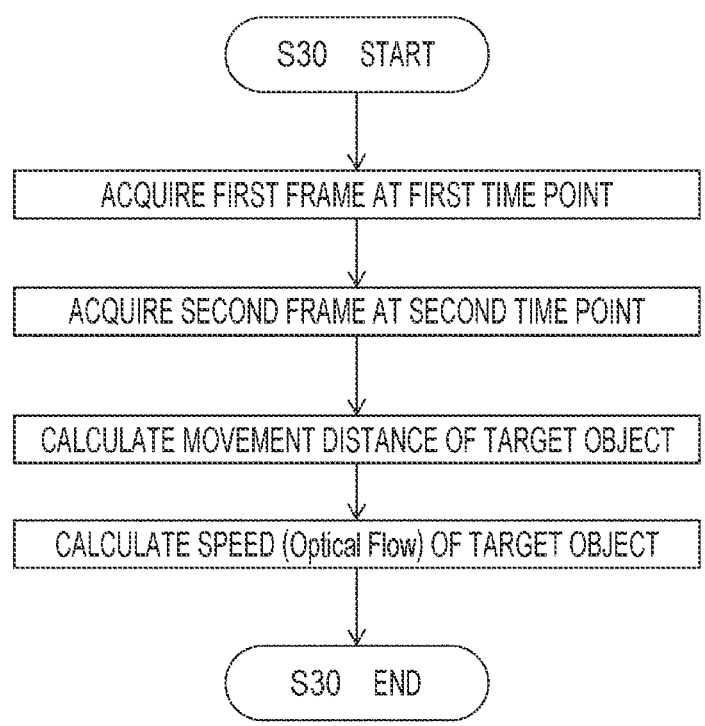
FIG. 3 is a flowchart depicting a method of calculating a speed of a target object.
Figure 4:
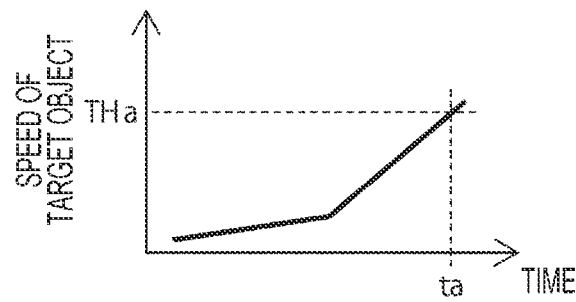
FIG. 4 is a graph depicting a speed of a target object.
Figure 5:
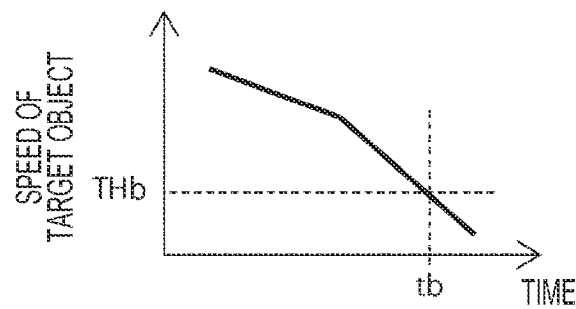
FIG. 5 is a graph depicting a speed of a target object.

FIG. 2 is a flowchart depicting an example of a method of controlling the solid-state imaging device 1 according to the first embodiment. FIG. 3 is a flowchart depicting a method of calculating the speed of the target object. FIGS. 4 and 5 are graphs depicting the speed of the target object. In the graphs of FIGS. 4 and 5, the vertical axis represents the speed of the target object, and the horizontal axis represents time.

First, the imaging section 10 starts imaging the target object (S10). The imaging section 10 images a target object at predetermined time intervals and generates a pixel signal.

Next, the ADC 20 and the signal processing section 30 perform AD conversion and signal processing on the imaged pixel signal of the target object to generate image data (S20). The image data is stored in the memory 40 as a frame generated for every time of imaging at predetermined time intervals.

Next, the motion detecting section 60 calculates the speed (optical flow) of the target object on the basis of the plurality of frames imaged by the imaging section 10 (S30). The motion detecting section 60 calculates the speed of the target object on the basis of the movement distance of the feature point of the target object between the first frame imaged at a certain time point and the second frame imaged at the next time point. The feature point of the target object is a pixel or an image region that can be clearly distinguished in terms of color or brightness from the non-target object in the target object and can recognize the same position of the target object among the plurality of frames in the image processing. For example, the feature point may be a portion having a large contrast such as an outer contour of the target object.

As depicted in FIG. 3, for example, the motion detecting section 60 acquires the first frame as the first image data imaged at the first time point from the memory 40 (S31). Next, the motion detecting section 60 acquires the second frame as the second image data imaged at the second time point from the memory 40 (S32). The first and second frames may be two frames with consecutive imaging times. Alternatively, the first and second frames may be two frames whose imaging times are separated by a certain amount.

Next, the motion detecting section 60 calculates the actual movement distance of the target object on the basis of the movement distance (the number of pixels) of the feature point of the target object on the frames between the first frame and the second frame (S33). Further, the motion detecting section 60 calculates the speed (optical flow) of the target object by dividing the movement distance of the target object by the interval of the imaging times of the first and second frames.

Referring again to FIG. 2. Next, the controller 70 compares the speed of the target object with the thresholds THa and THb (S41 and S42). For example, as indicated by ta in FIG. 4, in a case where the speed of the target object increases to exceed the threshold (first threshold) THa (at time point ta, and YES in S41), the controller 70 transmits a gain control signal to the inertial measurement section 80 to decrease the output gain of the inertial measurement section 80. The inertial measurement section 80 decreases the output gain according to the gain control signal to expand the measurable range of the acceleration of the mobile body (S51).

When the speed of the target object increases, there is a high possibility that the mobile body moves at a relatively large acceleration in order for the imaging section 10 to capture and image the target object accordingly. In this case, the inertial measurement section 80 widely measures the acceleration of the mobile body by decreasing the output gain and expanding the measurable range.

In this case, if the measurable range is not expanded, there is a possibility that the acceleration of the mobile body is deviate from the measurable range of the inertial measurement section 80 and, thus, the inertial measurement section 80 is not be able to accurately measure the acceleration of the mobile body.

Meanwhile, according to the present disclosure, even if the acceleration of the mobile body increases in order to capture the target object, the inertial measurement section 80 can expand the measurable range in real time following the increase. Therefore, it is possible to suppress the deviation of the acceleration of the mobile body from the measurable range, and the inertial measurement section 80 can accurately measure the acceleration of the mobile body.

On the other hand, for example, as indicated by THb in FIG. 5, in a case where the speed of the target object decreases to fall below the threshold (second threshold) THb (at time point tb, and YES in S42), the controller 70 transmits a gain control signal to the inertial measurement section 80 to increase the output gain of the inertial measurement section 80. The inertial measurement section 80 increases the output gain according to the gain control signal to narrow the measurable range of the acceleration of the mobile body (S52).

When the speed of the target object decreases, there is a high possibility that the acceleration or angular velocity of the mobile body becomes relatively small in order to image an image of the target object by the imaging section 10. In this case, the inertial measurement section 80 measures the acceleration of the mobile body with high sensitivity by increasing the output gain to narrow the measurable range.

In this case, if the output gain is not increased to narrow the measurable range, there is a possibility that the output gain of the inertial measurement section 80 is so small that the inertial measurement section 80 is not be able to accurately measure the acceleration of the mobile body with high sensitivity.

Meanwhile, according to the present disclosure, even when the acceleration of the mobile body decreases, the inertial measurement section 80 can increase the output gain in real time following the decrease. Therefore, the inertial measurement section 80 can accurately measure the acceleration of the mobile body with high sensitivity.

In a case where the speed of the target object is between the thresholds THa and THb (NO in S41 and S42), the inertial measurement section 80 maintains the measurable range without changing the output gain (S60).

Thereafter, steps S10 to S60 are repeatedly executed until imaging by the imaging section 10 is completed (NO in S70). When the imaging of the imaging section 10 is completed (YES in S70), the operation of the solid-state imaging device 1 is completed.

As described above, solid-state imaging device 1 according to the present disclosure includes, in the image section 10 such as a CMOS image sensor, the motion detecting section 60 that detects the speed (optical flow) of the target object, and the inertial measurement section (IMU) 80 that detects the acceleration and the posture of the mobile body. Therefore, the solid-state imaging device 1 can dynamically change the setting of the output gain and the measurable range of the inertial measurement section 80 in real time during imaging according to the speed (optical flow) of the target object to be imaged. As a result, the solid-state imaging device 1 can accurately measure the acceleration and the angular velocity of the mobile body with high sensitivity while imaging the target object.

Note that, in the present disclosure, the solid-state imaging device 1 changes the setting of the output gain and the measurable range of the inertial measurement section 80 by using both the thresholds THa and THb in FIGS. 4 and 5. That is, the output gain and the measurable range of the inertial measurement section 80 can be set in three stages. However, the solid-state imaging device 1 may change the setting of the output gain and the measurable range of the inertial measurement section 80 using any one of the thresholds THa and THb. That is, the output gain and the measurable range of the inertial measurement section 80 may be set in two stages. Further, three or more thresholds may be set so that the output gain and the measurable range of inertial measurement section 80 can be set in more stages.

Modification

Figure 6:
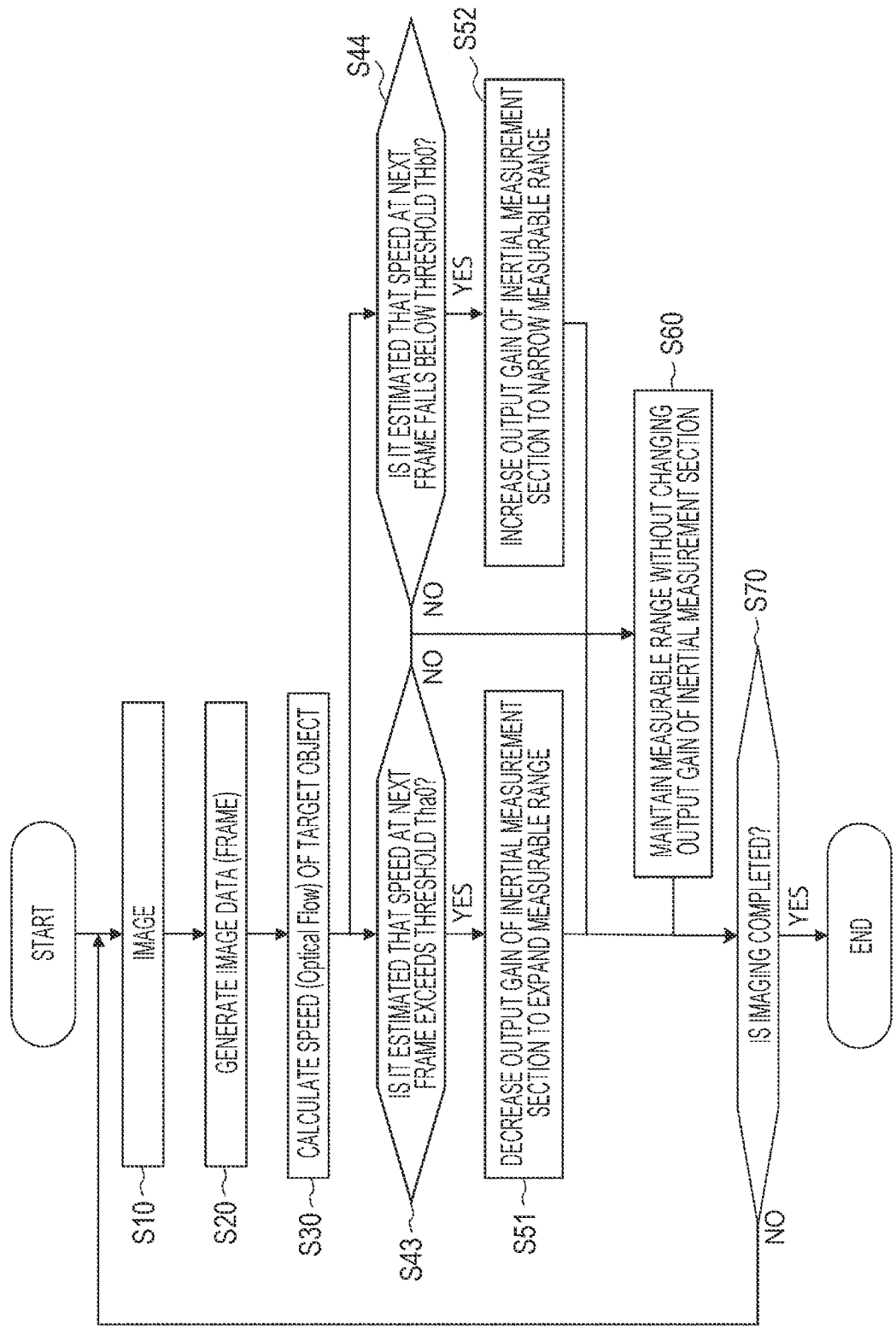
FIG. 6 is a flowchart depicting an example of a method of controlling a solid-state imaging device according to a modification of the first embodiment.
Figure 7:
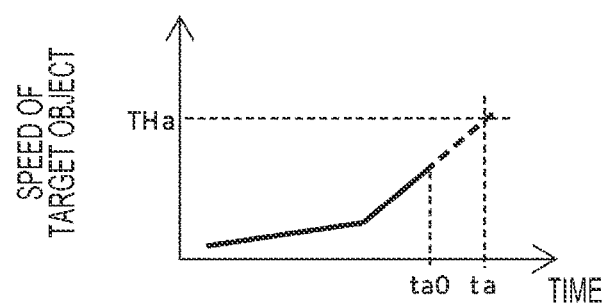
FIG. 7 is a graph depicting a speed of a target object.
Figure 8:
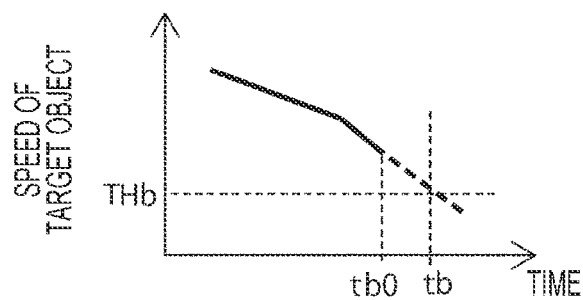
FIG. 8 is a graph depicting a speed of a target object.

FIG. 6 is a flowchart depicting an example of a method of controlling the solid-state imaging device 1 according to a modification of the first embodiment. FIGS. 7 and 8 are graphs depicting the speed of the target object. In these graphs, the vertical axis represents the speed of the target object, and the horizontal axis represents time. The configuration of the present modification may be the same as the configuration of the first embodiment. Furthermore, the basic operation of the present modification is similar to the operation of the first embodiment, but a method of determining switching of the output gain of the inertial measurement section 80 is different.

In the operation of the solid-state imaging device 1 according to the present modification, after steps S10 to S30, the controller 70 estimates the speed of the target object in the next frame from the change in the speed of the target object, and determines whether or not the estimated speed of the target object reaches the thresholds (third thresholds) THa and THb (S43, S44).

For example, in a case where it is estimated that the speed of the target object at the next time point to exceeds the threshold THa on the basis of the gradient of the speed of the target object at the current time point ta0 depicted in FIG. 7 (YES in S43), the controller 70 transmits a gain control signal to the inertial measurement section 80 to decrease the output gain of the inertial measurement section 80. The inertial measurement section 80 decreases the output gain according to the gain control signal to expand the measurable range of the acceleration of the mobile body (S51).

Therefore, even if the mobile body suddenly increases the acceleration in order to capture the target object, the inertial measurement section 80 can expand the measurable range in advance is anticipation of this. As a result, the inertial measurement section 80 can more reliably suppress the deviation of the acceleration of the mobile body from the measurable range.

On the other hand, for example, in a case where it is estimated that the speed of the target object at the next time point tb falls below the threshold THb on the basis of the gradient of the speed of the target object at the current time point tb0 depicted in FIG. 8 (YES in S44), the controller 70 transmits a gain control signal to the inertial measurement section 80 to increase the output gain of the inertial measurement section 80. The inertial measurement section 80 increases the output gain according to the gain control signal to narrow the measurable range of the acceleration of the mobile body (S52).

Therefore, even if the mobile body suddenly decreases the acceleration, the inertial measurement section 80 can increase the output gain in advance in anticipation of this. As a result, the inertial measurement section 80 can accurately measure the acceleration of the mobile body with high sensitivity in advance.

In the next frame, in a case where it is estimated that the speed of the target object is between the thresholds THa and THb (NO in S43 and S44), the inertial measurement section 80 maintains the measurable range without changing the output gain (S60). The subsequent operation may be is a similar manner to the operation of the first embodiment.

The inertial measurement section 80 according to the present modification receives a gain control signal from the controller 70 and changes the measurable range in a case where it is estimated that the speed of the target object reaches the threshold in the next frame, from the gradient of the speed of the target object calculated in the frame at the current time point. Therefore, the solid-state imaging device 1 can accurately measure the acceleration and the angular velocity of the mobile body with high sensitivity while imaging the target object.

Chip Configuration

The solid-state imaging device 1 may be configured as one semiconductor chip as a whole, or may be configured by a plurality of semiconductor chips. In a case where the solid-state imaging device 1 is configured as a plurality of semiconductor chips, the imaging section 10 and the other processing circuits may be formed as separate semiconductor chips 511 and 512, and the semiconductor chip 511 and the semiconductor chip 512 may be stacked.

Figure 9:
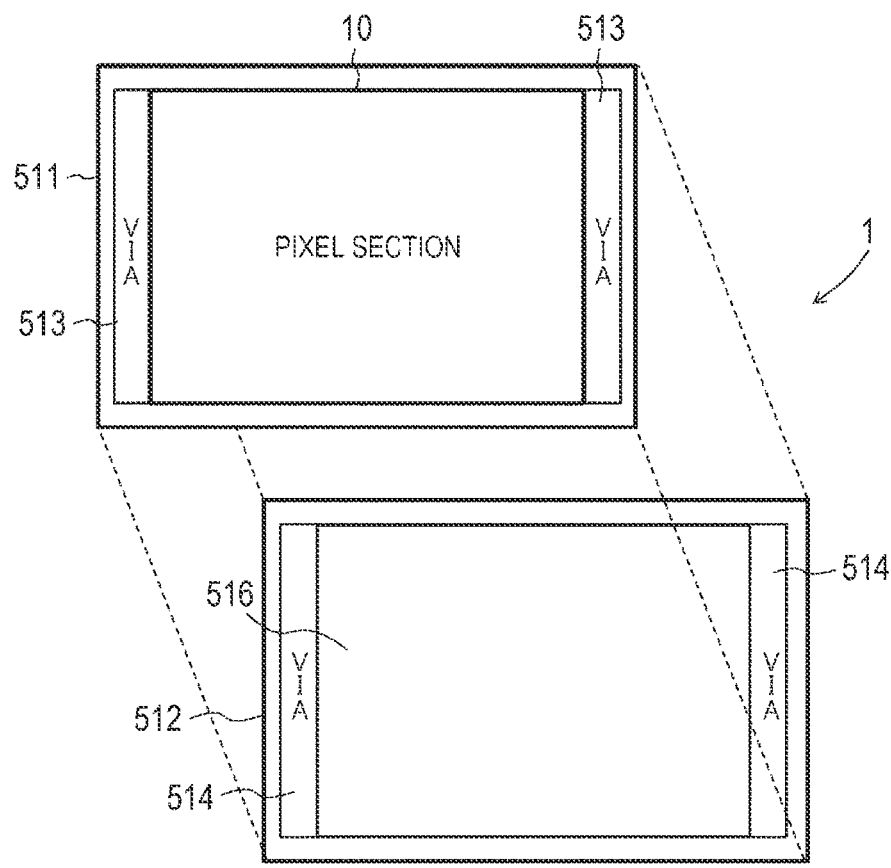
FIG. 9 is a conceptual diagram depicting an example of a solid-state imaging device in which a semiconductor chip of an imaging section and a semiconductor chip of a processing circuit are stacked.

For example, FIG. 9 is a conceptual diagram depicting an example of the solid-state imaging device 1 in which the semiconductor chip 511 of the imaging section 10 and the semiconductor chip 512 of the processing circuit are stacked. As depicted in FIG. 9, the solid-state imaging device 1 includes two stacked semiconductor chips 511 and 512.

The semiconductor chip 511 as the first semiconductor chip includes an imaging section 10 formed on a semiconductor substrate. The semiconductor chip 512 as the second semiconductor chip includes a processing circuit (ADC 20, signal processing section 30, memory 40, output control section 50, motion detecting section 60, controller 70, and inertial measurement section 80) formed on another semiconductor substrate.

Each pixel of the imaging section 10 of the semiconductor chip 511 and elements of the processing circuit (20 to 80) of the semiconductor chip 512 may be electrically connected using, for example, through electrodes and the like such as a through silicon via (TSV) provided in via regions 513 and 514. In addition, both semiconductor chips may be bonded (Cu—Cu bonding) so that the wiring of the semiconductor chip 511 and the wiring of the semiconductor chip 511 are brought into contact with each other. Further, although not illustrated, the imaging section 10 and a part of the processing circuit (20 to 80) may be configured as one semiconductor chip 511, and other configurations may be configured as another semiconductor chip 512.

FIGS. 10 to 15 are schematic diagrams depicting examples of layout arrangements of processing circuits in the semiconductor chip 512. The semiconductor chip 512 includes an ADC 20, a signal processing section 30, a memory 40, an output control section 50, a motion detecting section 60, a controller 70, and an inertial measurement section 80 as processing circuits.

Here, the motion detecting section 60 and the signal processing section 30 consume more current than other configurations. In a case where the inertial measurement section 80 detects the acceleration of the mobile body by the capacitance, if the motion detecting section 60 and the signal processing section 30 are close to the inertial measurement section 60, the current flowing through the motion detecting section 60 and the signal processing section 30 affects the capacitance of the inertial measurement section 80. In this case, the current flowing through the motion detecting section 60 and the signal processing section 30 becomes noise, and the inertial measurement section 80 cannot accurately measure the acceleration.

In order to cope with this, in the present disclosure, the memory 40 or the controller 70 with relatively small current consumption is disposed between the inertial measurement section 80 and the signal processing section 30 and between the inertial measurement section 80 and the motion detecting section 60. Therefore, the inertial measurement section 80 is separated from the signal processing section 30 and the motion detecting section 60, and parasitic capacitances between the inertial measurement section 80 and the signal processing section 30 and between the inertial measurement section 80 and the motion detecting section 60 are reduced. As a result, the inertial measurement section 80 is less likely to be affected by noise due to the current of the signal processing section 30 and the motion detecting section 60, and can accurately measure the acceleration.

Figure 10:
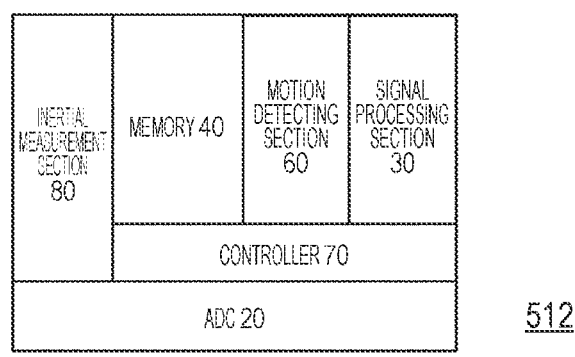
FIG. 10 is a schematic diagram depicting an example of layout arrangement of a processing circuit in a semiconductor chip.

For example, in FIG. 10, the inertial measurement section 80, the memory 40, the motion detecting section 60, and the signal processing section 30 are disposed in this order from the left of the semiconductor chip 512. The memory 40 is disposed between the inertial measurement section 80 and the motion detecting section 60. Further, the memory 40 and the motion detecting section 60 are disposed between the inertial measurement section 80 and the signal processing section 30.

Figure 11:
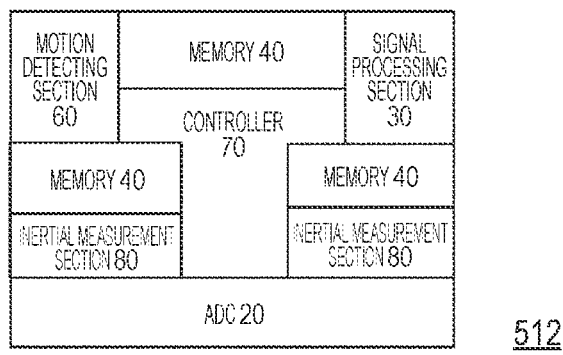
FIG. 11 is a schematic diagram depicting an example of layout arrangement of a processing circuit in a semiconductor chip.

In FIG. 11, the motion detecting section 60, the memory 40, and the inertial measurement section 80 are disposed in this order on the left side of the semiconductor chip 512. Therefore, the memory 40 is disposed between the inertial measurement section 80 and the motion detecting section 60. On the right side of the semiconductor chip 512, the signal processing section 30, the memory 40, and the inertial measurement section 80 are disposed in this order. Therefore, the memory 40 is disposed between the inertial measurement section 80 and the signal processing section 30. Note that the memory 40 and the inertial measurement section 80 are provided separately on both sides of the semiconductor chip 512.

Further, a part of the memory 40 and the controller 70 are disposed between the motion detecting section 60 and the signal processing section 30, between the plurality of memories 40 on both sides of the semiconductor chip 512, or between the plurality of inertial measurement sections 80 on both sides of the semiconductor chip 512.

Figure 12:
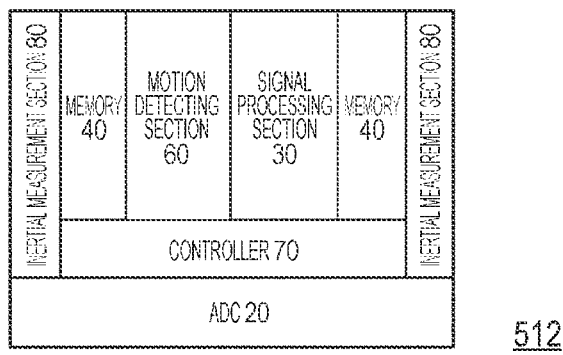
FIG. 12 is a schematic diagram depicting an example of layout arrangement of a processing circuit in a semiconductor chip.

In FIG. 12, the inertial measurement section 80, the memory 40, the motion detecting section 60, the signal processing section 30, the memory 40, and the inertial measurement section 80 are disposed in this order from the left of the semiconductor chip 512. The memory 40 and the inertial measurement section 80 are provided separately on both sides of the semiconductor chip 512. Even in such an arrangement, the memory 40 is disposed between the inertial measurement section 80 and the motion detecting section 60, and is disposed between the inertial measurement section 80 and the signal processing section 30.

Figure 13:
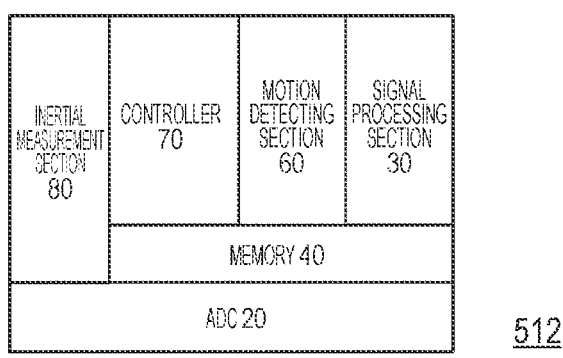
FIG. 13 is a schematic diagram depicting an example of layout arrangement of a processing circuit in a semiconductor chip.
Figure 14:
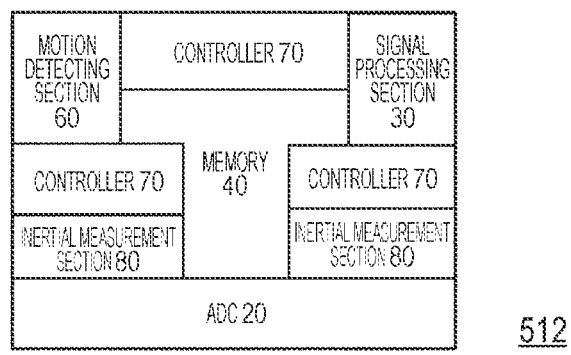
FIG. 14 is a schematic diagram depicting an example of layout arrangement of a processing circuit in a semiconductor chip.
Figure 15:
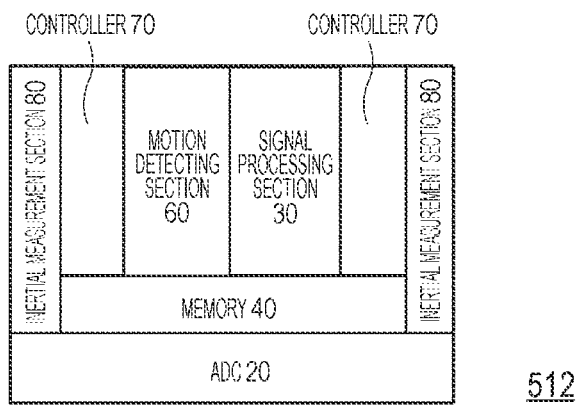
FIG. 15 is a schematic diagram depicting an example of layout arrangement of a processing circuit in a semiconductor chip.

FIG. 13 depicts a layout arrangement of the semiconductor chip 512 in which the arrangement of the memory 40 and the controller 70 of FIG. 10 is exchanged. FIG. 14 depicts a layout arrangement of the semiconductor chip 512 in which the arrangement of the memory 40 and the controller 70 of FIG. 11 is exchanged. FIG. 15 depicts a layout arrangement of the semiconductor chip 512 in which the arrangement of the memory 40 and the controller 70 of FIG. 12 is exchanged. As described above, even if the arrangement of the memory 40 and the controller 70 in FIGS. 10 to 12 is exchanged, a similar effect can be obtained.

Note that, in FIGS. 10 to 12, the ADC 20 is disposed at the lower end of the semiconductor chip 512, but may be disposed at an arbitrary position.

Figure 16:
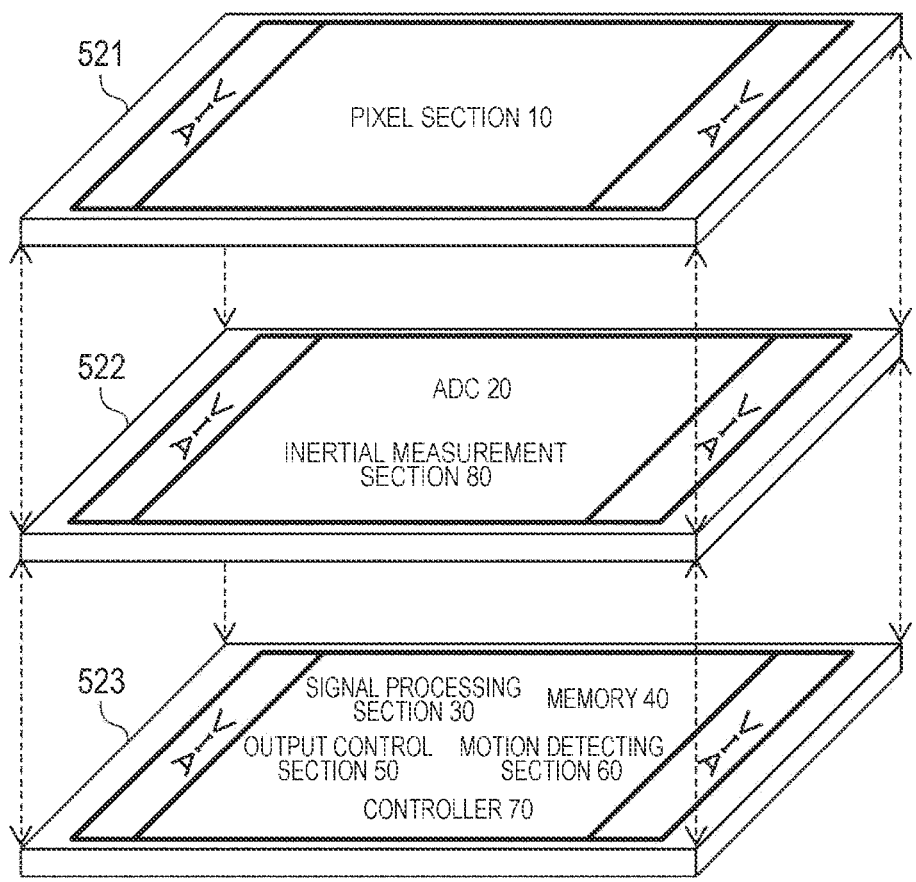
FIG. 16 is a conceptual diagram depicting an example of a solid-state imaging device in which a semiconductor chip of a pixel section, a semiconductor chip of an ADC and an inertial measurement section, and a semiconductor chip of other processing circuits are stacked.

FIG. 16 is a conceptual diagram depicting an example of the solid-state imaging device 1 in which the semiconductor chip 521 of the imaging section 10, the semiconductor chip 522 of the ADC 20 and the inertial measurement section 80, and the semiconductor chip 523 of other processing circuits are stacked. The solid-state imaging device 1 may include three semiconductor chips 521 to 523 stacked.

The semiconductor chip 521 as the first semiconductor chip includes an imaging section 10 formed on a semiconductor substrate. The semiconductor chip 522 as the second semiconductor chip includes a part (ADC 20 and inertial measurement section 80) of processing circuits formed on another semiconductor substrate. The semiconductor chip 523 as the third semiconductor chip includes other parts (signal processing section 30, memory 40, output control section 50, motion detecting section 60, and controller 70) of processing circuits formed on further another semiconductor substrate.

Similarly to the solid-state imaging device 1 described with reference to FIG. 9, the semiconductor chips 521 to 523 may be electrically connected using through electrodes and the like such as a TSV provided in a via region. Furthermore, the semiconductor chips 521 and 522 may be bonded to each other (Cu—Cu bonding) such that the wirings of the semiconductor chips 521 and 522 are brought into contact with each other. The semiconductor chips 522 and 523 may be bonded (Cu—Cu bonding) such that the wirings of the semiconductor chips 522 and 523 are brought into contact with each other. Note that the sold-state imaging device 1 may be configured by stacking four or more semiconductor chips.

As described above, by separating the imaging section 10 from logic circuits with a large current consumption such as the signal processing section 30 and the motion detecting section 60, it is possible to suppress noise from entering the pixel signal from the imaging section 10.

In addition, since the inertial measurement section 80 is disposed in the immediate vicinity of the imaging section 10, the coordinate axis of the imaging section 10 and the coordinate axis of the inertial measurement section 80 can be substantially aligned, and position correction between the imaging section 10 and the inertial measurement section 80 is facilitated.

The technology according to embodiments of the present disclosure (present technology) can be applied to various products. For example, the technology according to embodiments of the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 17:
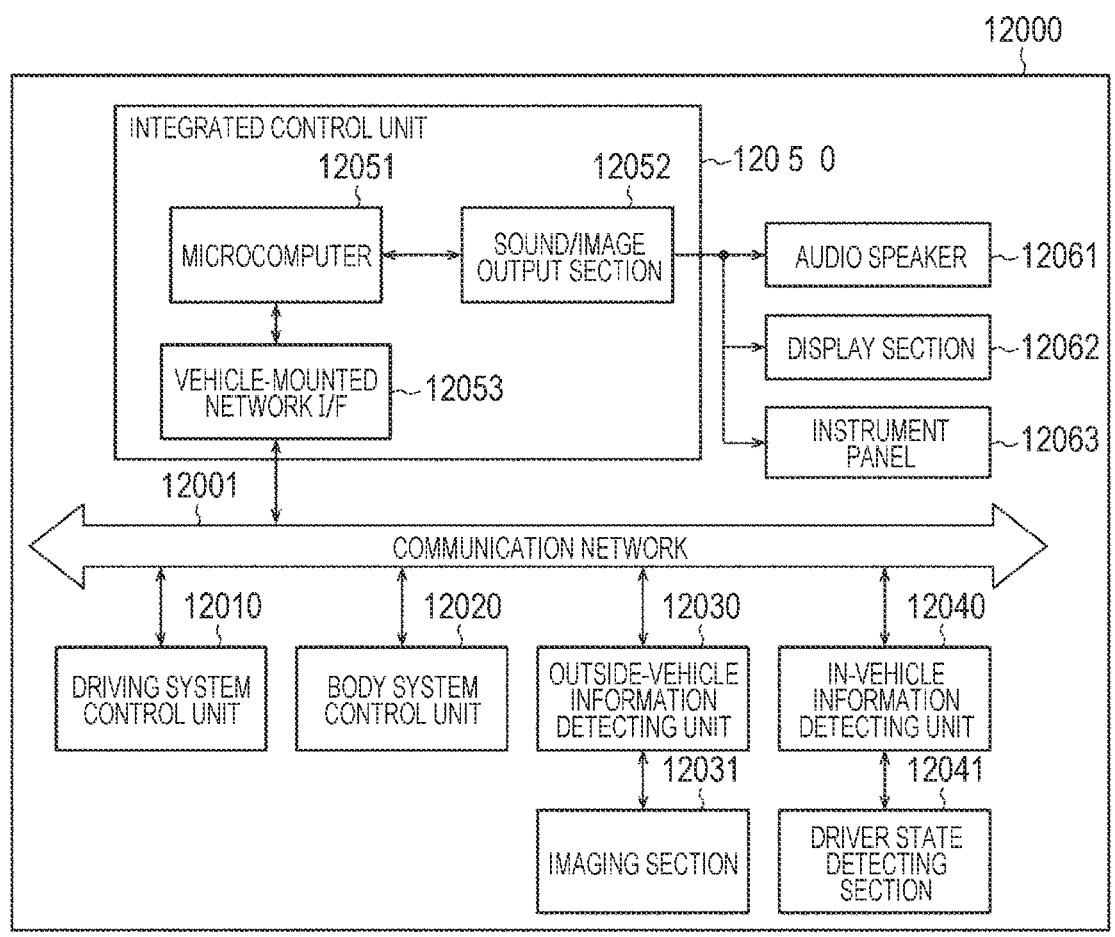
FIG. 17 is a block diagram depicting an example of schematic configuration of a vehicle control system as an example of a mobile body control system to which the technology according to an embodiment of the present disclosure can be applied.

FIG. 17 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 17, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto. The solid-state imaging device 1 according to the present disclosure may be provided in the imaging section 12031.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like. The solid-state imaging device 1 according to the present disclosure may be the imaging section 12031, or may be provided separately from the imaging section 12031.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. An audio speaker 12061, a display section 12062, and an instrument panel 12063 are illustrated as the output device. The display section 12062 may, for example, include at least one of an on-board display and a head-up display.

Figure 18:
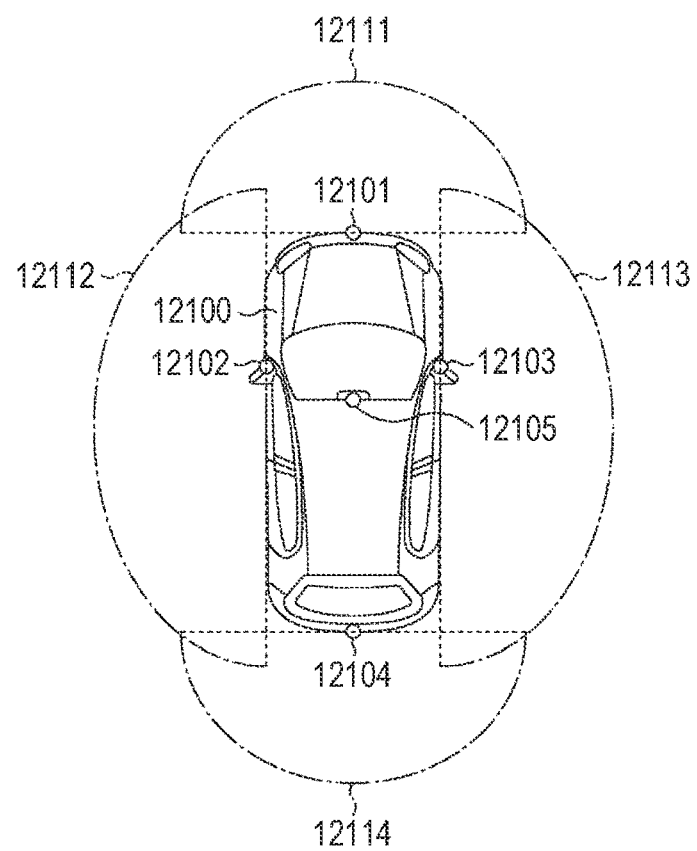
FIG. 18 is a diagram depicting an example of the installation position of an imaging section.

FIG. 18 is a diagram depicting an example of the installation position of the imaging section 12031.

In FIG. 18, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The front images acquired by the imaging sections 12101 and 12105 are used mainly to detect a preceding vehicle, a pedestrian, an obstacle, a signal, a traffic sign, a lane, or the like.

Incidentally, FIG. 18 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Note that the, present technology can have the following configurations.

(1)

A solid-state imaging device disposed on a mobile body, the solid-state imaging device including:
 an imaging section that photoelectrically converts incident light into a charge amount according to a light amount and images a target object;
 a motion detecting section that calculates a speed of the target object on the basis of a plurality of images imaged by the imaging section; and
 an inertial measurement section that detects an acceleration or an angular velocity of the mobile body and changes a measurable range of the acceleration or the angular velocity of the mobile body according to the speed of the target object.

(2)

The solid-state imaging device according to (1),
 in which the inertial measurement section expands the measurable range in a case where the speed of the target object exceeds a first threshold.

(3)

The solid-state imaging device according to (1) or (2),
 in which the inertial measurement section narrows the measurable range in a case where the speed of the target object falls below a second threshold.

(4)

The solid-state imaging device according to any one of (1) to (3),
 in which the imaging section images the target object at predetermined time intervals, and
 the motion detecting section calculates the speed of the target object on the basis of a movement distance of a feature point of the target object between a first image imaged at a certain time point and a second image imaged at a next time point.

(5)

The solid-state imaging device according to (4),
 in which the inertial measurement section changes the measurable range in a case where it is estimated, from a change in the speed of the target object, that the speed of the target object reaches a third threshold in a third image imaged at a next time point.

(6)

The solid-state imaging device according to any one of (1) to (5), further including:
 an AD converter that performs analogue-to-digital (AD) conversion of a pixel signal from the imaging section into a digital signal;
 a signal processing section that processes the digital signal to generate image data;
 a memory that stores the image data; and a controller that controls a measurable range of the inertial measurement section on the basis of the speed of the target object, in which the controller or the memory is disposed between the inertial measurement section and the signal processing section.

(7)

The solid-state imaging device according to any one of (1) to (5), further including:

an AD converter that performs AD conversion of a pixel signal from the imaging section into a digital signal;

a signal processing section that processes the digital signal to generate image data;

a memory that stores the image data; and a controller that controls a measurable range of the inertial measurement section on the basis of the speed of the target object, in which the controller or the memory is disposed between the inertial measurement section and the motion detecting section.

(8)

The solid-state imaging device according to any one of (1) to (7), being configured by stacking:

a first semiconductor chip including the imaging section; and a second semiconductor chip including the motion detecting section and the inertial measurement section.

(9)

The solid-state imaging device according to (6) or (7), being configured by stacking:

a first semiconductor chip including the imaging section; and a second semiconductor chip including the motion detecting section, the inertial measurement section, the AD converter, the signal processing section, the memory, and the controller.

(10)

The solid-state imaging device according to any one of (1) to (7), being configured by stacking:

a first semiconductor chip including the imaging section;

a second semiconductor chip including the inertial measurement section; and a third semiconductor chip including the motion detecting section.

(11)

The solid-state imaging device according to (6) or (7), being configured by stacking:

a first semiconductor chip including the imaging section;

a second semiconductor chip including the inertial measurement section and the AD converter; and a third semiconductor chip including the motion detecting section, the signal processing section, the memory, and the controller.

(12)

A method of controlling a solid-state imaging device disposed on a mobile body, the solid-state imaging device including an imaging section that photoelectrically converts incident light into a charge amount according to a light amount and images a target object, a motion detecting section that calculates a speed of the target object, and an inertial measurement section that detects an acceleration or an angular velocity, the method including:

imaging the target object by the imaging section;

calculating, in the motion detecting section, a speed of the target object on the basis of a plurality of images imaged by the imaging section; and changing, in the inertial measurement section, a measurable range of an acceleration or an angular velocity of the mobile body according to the speed of the target object.

(13)

The method according to (12), in which the changing of the measurable range includes:

expanding the measurable range in a case where the speed of the target object exceeds a first threshold; and narrowing, in the inertial measurement section, the measurable range in a case where the speed of the target object fails below a second threshold.

(14)

The method according to (12) or (13), in which the target object is imaged at predetermined time intervals, and the speed of the target object is calculated on the basis of a movement distance of a feature point of the target object between a first image imaged at a certain time point and a second image imaged at a next time point.

(15)

The method according to (14), in which the measurable range is changed in a case where it is estimated, from a change in the speed of the target object, that the speed of the target object reaches a third threshold in a third image imaged at a next time point.

(16)

A mobile body including a solid-state imaging device, the solid-state imaging device including:

an imaging section that photoelectrically converts incident light into a charge amount according to a light amount and images a target object;

a motion detecting section that calculates a speed of the target object on the basis of a plurality of images imaged by the imaging section; and an inertial measurement section that detects an acceleration or an angular velocity of the mobile body and changes a measurable range of the acceleration or the angular velocity of the mobile body according to the speed of the target object. Note that the present disclosure is not limited to the above-described embodiments, and various modifications can be made without departing from the gist of the present disclosure. Furthermore, the effects described in the present specification are merely examples and are not limited, and other effects may be provided.

REFERENCE SIGNS LIST

1 Solid-state imaging device
10 Imaging section
20 ADC
30 Signal processing section
40 Memory
50 Output control section
60 Motion detecting section
70 Controller
80 Inertial measurement section

The invention claimed is:

1. A solid-state imaging device configured for disposition on a mobile body, the solid-state imaging device comprising:

an imaging section that photoelectrically converts incident light into a charge amount according to a light amount and images a target object;

a motion detecting section that calculates a speed of the target object on a basis of a plurality of images imaged by the imaging section;

an inertial measurement section that detects an acceleration or an angular velocity of the mobile body and changes a measurable range of the acceleration or the angular velocity of the mobile body according to the speed of the target object;
an AD converter that performs AD conversion of a pixel signal from the imaging section into a digital signal;
a signal processing section that processes the digital signal to generate image data;
a memory that stores the image data; and
a controller that controls a measurable range of the inertial measurement section on a basis of the speed of the target object, wherein
the controller or the memory is electrically connected between the inertial measurement section and the motion detecting section.

2. The solid-state imaging device according to claim 1, wherein
the inertial measurement section expands the measurable range in a case where the speed of the target object exceeds a first threshold.

3. The solid-state imaging device according to claim 1, wherein
the inertial measurement section narrows the measurable range in a case where the speed of the target object falls below a second threshold.

4. The solid-state imaging device according to claim 1, wherein
the imaging section images the target object at predetermined time intervals, and the motion detecting section calculates the speed of the target object on a basis of a movement distance of a feature point of the target object between a first image imaged at a certain time point and a second image imaged at a next time point.

5. The solid-state imaging device according to claim 4, wherein
the inertial measurement section changes the measurable range in a case where it is estimated, from a change in the speed of the target object, that the speed of the target object reaches a third threshold in a third image imaged at a next time point.

6. The solid-state imaging device according to claim 1, being configured by stacking:
a first semiconductor chip including the imaging section; and
a second semiconductor chip including the motion detecting section and the inertial measurement section.

7. The solid-state imaging device according to claim 1, being configured by stacking:
a first semiconductor chip including the imaging section;
a second semiconductor chip including the inertial measurement section; and
a third semiconductor chip including the motion detecting section.

8. A solid-state imaging device configured for disposition on a mobile body, the solid-state imaging device comprising:
an imaging section that photoelectrically converts incident light into a charge amount according to a light amount and images a target object;
a motion detecting section that calculates a speed of the target object on a basis of a plurality of images imaged by the imaging section;
an inertial measurement section that detects an acceleration or an angular velocity of the mobile body and changes a measurable range of the acceleration or the angular velocity of the mobile body according to the speed of the target object;
an AD converter that performs analogue-to-digital (AD) conversion of a pixel signal from the imaging section into a digital signal;
a signal processing section that processes the digital signal to generate image data;
a memory that stores the image data; and
a controller that controls a measurable range of the inertial measurement section on a basis of the speed of the target object, wherein
the controller or the memory is electrically connected between the inertial measurement section and the signal processing section.

9. The solid-state imaging device according to claim 8, being configured by stacking:
a first semiconductor chip including the imaging section; and
a second semiconductor chip including the motion detecting section, the inertial measurement section, the AD converter, the signal processing section, the memory, and the controller.

10. The solid-state imaging device according to claim 8, being configured by stacking:
a first semiconductor chip including the imaging section;
a second semiconductor chip including the inertial measurement section and the AD converter; and
a third semiconductor chip including the motion detecting section, the signal processing section, the memory, and the controller.

11. A mobile body including a solid-state imaging device, the solid-state imaging device including:
an imaging section that photoelectrically converts incident light into a charge amount according to a light amount and images a target object;
a motion detecting section that calculates a speed of the target object on a basis of a plurality of images imaged by the imaging section;
an inertial measurement section that detects an acceleration or an angular velocity of the mobile body and changes a measurable range of the acceleration or the angular velocity of the mobile body according to the speed of the target object;
an AD converter that performs AD conversion of a pixel signal from the imaging section into a digital signal;
a signal processing section that processes the digital signal to generate image data;
a memory that stores the image data; and
a controller that controls a measurable range of the inertial measurement section on a basis of the speed of the target object, wherein
the controller or the memory is electrically connected between the inertial measurement section and the motion detecting section.

12. The mobile body according to claim 11, wherein the inertial measurement section expands the measurable range in a case where the speed of the target object exceeds a first threshold.

13. The mobile body according to claim 11, wherein the inertial measurement section narrows the measurable range in a case where the speed of the target object falls below a second threshold.

14. The mobile body according to claim 11, wherein the solid-state imaging device is configured by stacking:
a first semiconductor chip including the imaging section; and a second semiconductor chip including the motion detecting section, the inertial measurement section, the AD converter, the signal processing section, the memory, and the controller.

15. A mobile body including a solid-state imaging device, the solid-state imaging device including:

an imaging section that photoelectrically converts incident light into a charge amount according to a light amount and images a target object;

a motion detecting section that calculates a speed of the target object on a basis of a plurality of images imaged by the imaging section;

an inertial measurement section that detects an acceleration or an angular velocity of the mobile body and changes a measurable range of the acceleration or the angular velocity of the mobile body according to the speed of the target object;

an AD converter that performs analogue-to-digital (AD) conversion of a pixel signal from the imaging section into a digital signal;

a signal processing section that processes the digital signal to generate image data;

a memory that stores the image data; and a controller that controls a measurable range of the inertial measurement section on a basis of the speed of the target object, wherein the controller or the memory is electrically connected between the inertial measurement section and the signal processing section.

* * * * *